(No Model.)  2 Sheets—Sheet 1.
C. CHAMBERS, Jr.
MACHINE FOR CUTTING AND CENTERING SHAFTING.
No. 263,654. Patented Aug. 29, 1882.
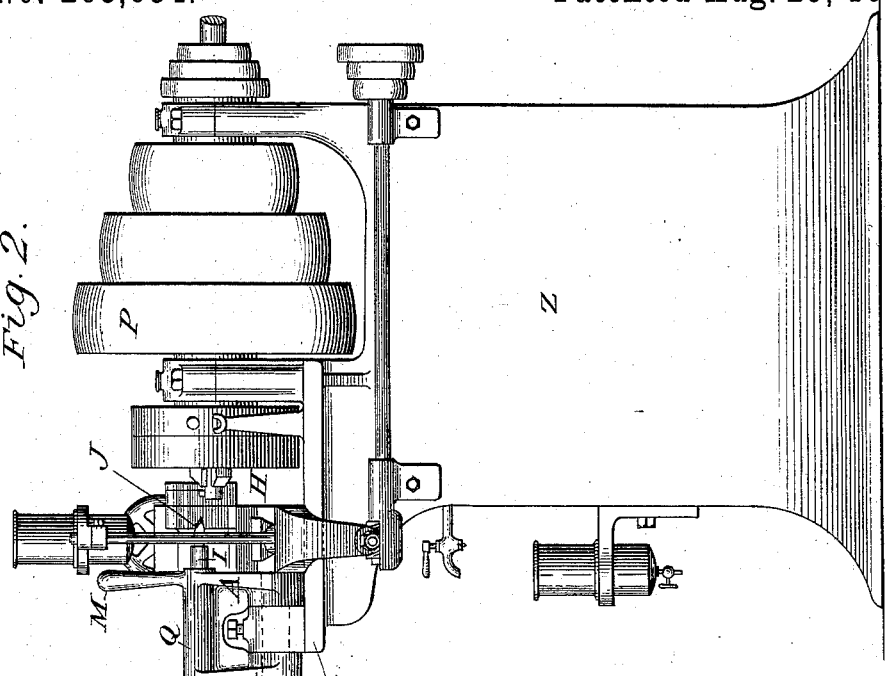
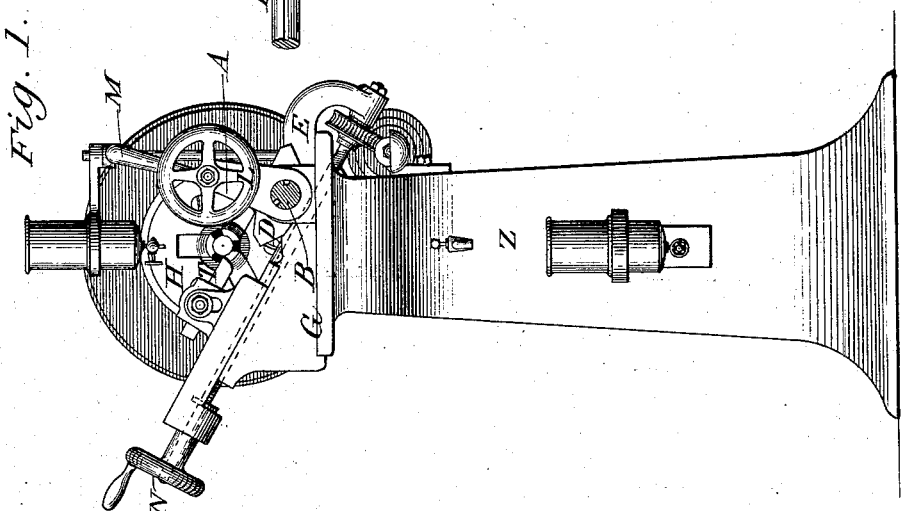
Witnesses:
John Burkhardt.
Wm. H. Carson.
Inventor.
Cyrus Chambers, Jr.
by his Atty, Joshua Pusey.

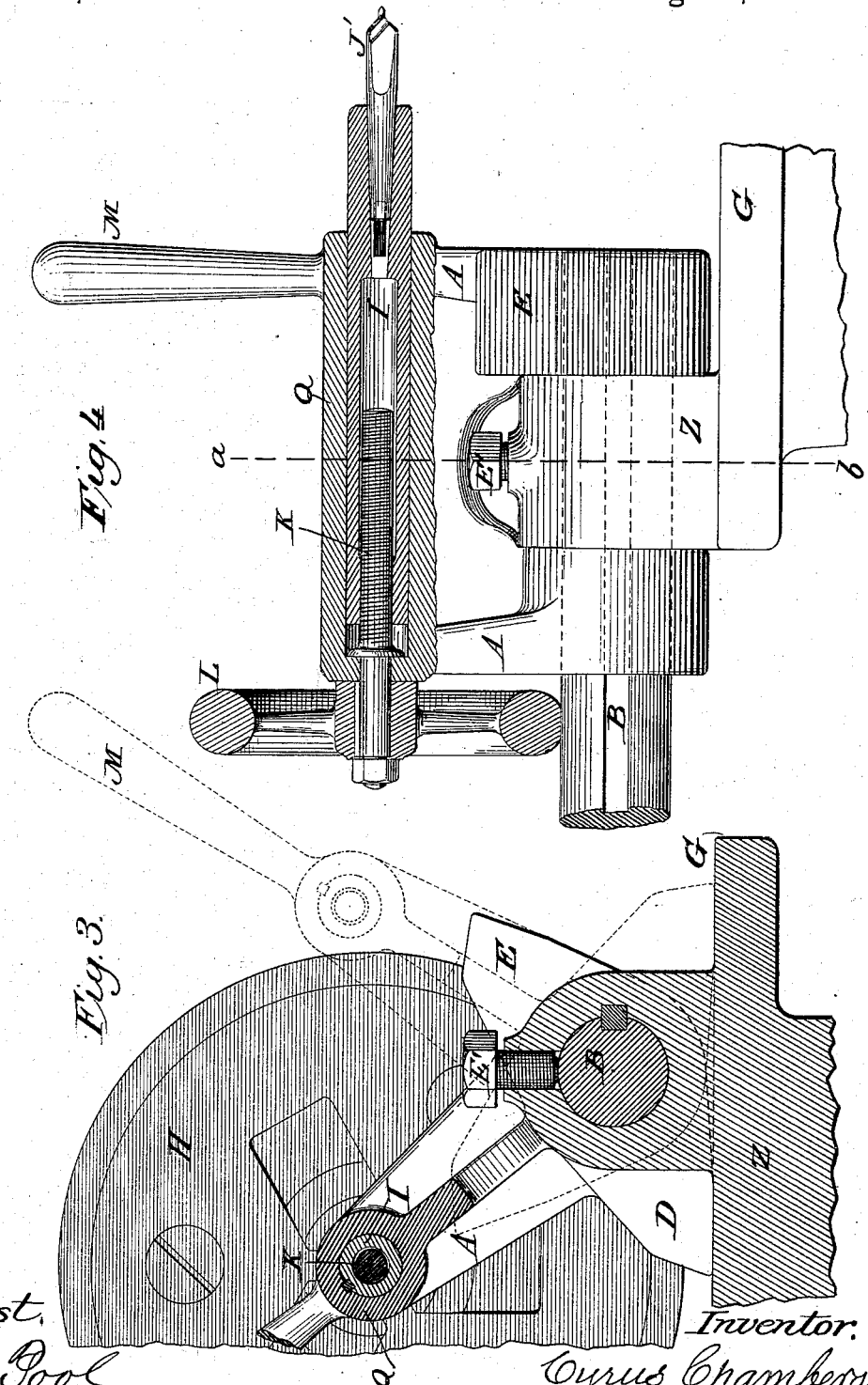

UNITED STATES PATENT OFFICE.

CYRUS CHAMBERS, JR., OF PHILADELPHIA, PENNSYLVANIA.

MACHINE FOR CUTTING AND CENTERING SHAFTING.

SPECIFICATION forming part of Letters Patent No. 263,654, dated August 29, 1882.

Application filed September 16, 1881. (No model.)

*To all whom it may concern:*

Be it known that I, CYRUS CHAMBERS, Jr., of the city of Philadelphia, in the county of Philadelphia and State of Pennsylvania, have invented certain new and useful Improvements in Machinery for Cutting and Centering Iron; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a front elevation of the chuck and of the centering and cutting devices. Fig. 2 is a side elevation of the same. Fig. 3 is a vertical transverse section on $a$ $a$ of Fig. 4; and Fig. 4 is a vertical longitudinal section, partly in elevation, of the centering device, its shaft, spindle, and center-bit.

The same part is indicated by the same letter of reference wherever it occurs in the drawings.

The object of my invention is to provide a machine which shall perform the double function of cutting off a shaft and centering it without removing it from the chuck; and it consists in combining, with a lathe provided with a severing-cutter, a centering device hung in a swinging frame, which operates to throw the center-bit into line with the center of rotation of the chuck whenever required, or to throw it off to one side when the shaft is to be removed, or to make way for the operation of the cutter, its position in both cases being determined by stops attached to its frame and coming into contact at either throw of the device with a plate on the frame of the machine, all substantially in the manner hereinafter more specifically set forth.

In the drawings, Z marks the frame of the machine, of which G is the top plate. P is the main driving-pulley, giving motion to the chuck H. The shaft B is fixed by set-screw E' to the frame Z. The upper part of the frame A carries a bored cylinder, Q, in which works a spindle, I, moved longitudinally by screw K, turned by hand-wheel L. The center-bit J is held in the end of this spindle, as shown. The frame A is rocked on the bar B by means of a handle, M, its motion being limited by the stops D E. When thrown in it occupies the position shown by full lines in Fig. 3. The stop D rests on plate G, and the center-bit J is aligned with the center of the chuck H. When thrown out it occupies the position shown by dotted lines in Fig. 3, so that a shaft entering the cutting-machine can pass it. Stop E then rests on plate G.

The cutting device is of the usual form, having a cutting-tooth, T, set by hand-wheel N and operated by a screw and worm in the common way, and needs no further description.

On shaft B is attached the carrier C, which supports the severed bar.

The operation is as follows: A bar of iron is run into the machine from the back or tail end, so that the rough end of the bar will protrude through the clutch far enough for the irregular part to project beyond the severing-tool. The jaws of the clutch are then closed and the machine set in motion, when the severing-tool is fed down and forward, cutting off all that part of the bar which projects beyond the tool. Oil is allowed during this operation to run from the upper cup onto the tool and is caught in the lower cup. When the upper cup is empty and the lower one filled their positions are exchanged. The rough end of the bar being cut off, the severing-tool is run back and the drilling attachment thrown forward, the lug stopping it in the proper position to make the center of the drill coincide with that of the bar held in the jaws of the clutch. The bar is then rotated, and the drill is fed forward till a hole is made in the center of the bar, known as a "drilled center." The drill is then withdrawn and thrown back, and the bar thus cut and centered is pushed forward the desired distance beyond the severing-tool to give the required length to the finished bar. Where many pieces of uniform length are to be cut and centered the adjustable gage is used to indicate the exact position of the cut. The severing operation is now repeated, the severed piece dropping into the V-shaped rest C, set to receive it. When it is removed the drilling is repeated on the end of the bar in the chuck. After the bar has been cut into the required number of pieces, centered at one end, these pieces are fed through the chuck a second time, with their undrilled ends in front, and are centered on the forward end in the same manner, thus producing any desired number of bars cut true and smooth to a uniform length and centered and drilled ready for the lathe or straightening-machine.

Having thus described my invention, what I claim, and desire to secure by Letters Patent, is—

1. In a lathe, the combination, with a bar-severing mechanism constructed and operating substantially as described, of the vibrating centering-head adapted to receive a centering-bit, whereby the end face of the bar or shaft may be centered without removing it from the lathe, as shown and described.

2. The combination, with a lathe and chuck, of the swinging centering-head provided with a centering-bit, substantially as and for the purpose described.

3. In combination with a lathe, the swinging centering-head provided with the concentering stop D and the stop E, substantially as and for the purpose set forth.

4. The combination, with the lathe-frame Z, of the centering-head frame A, shaft B, handle M, cylinder Q, spindle I, bit J, feed-screw K, and hand-wheel L, all constructed, arranged, and operating substantially in the manner specified.

In testimony that I claim the foregoing as my own I affix my signature in presence of two witnesses.

CYRUS CHAMBERS, Jr.

Witnesses:
A. WAGENKNIGHT,
J. W. EVANS.